(12) United States Patent
Sugamata et al.

(10) Patent No.: US 7,035,488 B2
(45) Date of Patent: Apr. 25, 2006

(54) OPTICAL WAVEGUIDE ELEMENT

(75) Inventors: Tohru Sugamata, Chiba (JP); Yoshihiro Hashimoto, Chiba (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/066,446

(22) Filed: Feb. 28, 2005

(65) Prior Publication Data

US 2005/0157970 A1   Jul. 21, 2005

Related U.S. Application Data

(63) Continuation of application No. 09/959,857, filed as application No. PCT/JP01/01688 on Mar. 5, 2001, now abandoned.

(30) Foreign Application Priority Data

Mar. 9, 2000   (JP) .............................. 2000-64490

(51) Int. Cl.
    *G02F 1/035*   (2006.01)
(52) U.S. Cl. .......................................... 385/3; 385/14
(58) Field of Classification Search ............... 385/1–3, 385/14, 129–132
    See application file for complete search history.

(56) References Cited

U.S. PATENT DOCUMENTS 5,138,480 A    8/1992   Dolfi et al.
5,291,565 A    3/1994   Schaffner et al.
5,303,079 A    4/1994   Gnauck et al.
5,712,933 A    1/1998   Nishimoto et al.
6,091,864 A    7/2000   Hofmeister
6,449,080 B1   9/2002   McBrien et al.

FOREIGN PATENT DOCUMENTS

| EP | 06235891 | 8/1994 |
|----|----------|--------|
| JP | 3-229215 | 10/1991 |
| JP | 8-86991 | 12/1991 |
| JP | 7-199134 | 2/1995 |
| JP | 7-234391 | 1/1998 |
| JP | 11-237593 | 8/1999 |
| JP | 2001-4967 | 1/2001 |
| WO | WO 96/36901 | 11/1996 |

*Primary Examiner*—Edward J. Glick
*Assistant Examiner*—Thomas R. Artman
(74) *Attorney, Agent, or Firm*—Young & Thompson

(57) ABSTRACT

A first branched optical waveguide and a second branched optical waveguide, to constitute a Mach-Zehnder type optical waveguide, are formed at the surface of a substrate. A first ground electrode, a signal electrode and a second ground electrode are provided on a buffer layer formed on the substrate. The second ground electrode is partially cut away and divided, to form a ditch therein, so that the modulating electrode composed of the signal electrode, the first and the second ground electrodes are substantially symmetrized on the center line between the first and the second optical waveguides. Then, the ratio (d2/d1) of the distance d2 between the signal electrode and the second branched optical waveguide to the distance d1 between the signal electrode and the first electrode is set within 3.5–7.5.

13 Claims, 6 Drawing Sheets

OPTICAL WAVEGUIDE ELEMENT

CROSS-REFERENCE TO RELATED ART

This application is a continuation of U.S. patent application Ser. No. 09/959,857 filed on Feb. 26, 2002. Application Ser. No. 09/959,857 is the national phase of PCT International Application No. PCT/JP01/01688 filed on Mar. 5, 2001, the entirety of which applications are hereby expressly incorporated by reference in the accompanying application.

TECHNICAL FIELD

This invention relates to an optical waveguide element, particularly to an optical waveguide element suitable for a high velocity optical modulator in high velocity and large capacity optical fiber communication system.

BACKGROUND ART

With the recent advance of high velocity and large capacity optical fiber communication system, a high velocity optical modulator composed of an optical waveguide element, which is a typical example of an external modulator, has been widely available. Such an optical waveguide modulator is constructed as follows.

FIG. 1 is a cross sectional view schematically showing an optical waveguide element used in a conventional high velocity modulator. FIG. 2 is a cross sectional view schematically showing another optical waveguide element used in a conventional high velocity modulator.

An optical waveguide element 10 depicted in FIG. 1 includes a substrate 1 made of a Z-cut single crystal of electro-optical effect and a buffer layer 2 formed on the substrate 1. Moreover, the optical modulator 10 has a first and a second branched optical waveguides 3-1 and 3-2 in the substrate 1, formed by a titanium inter-diffusion method or the like. The optical waveguides 3-1 and 3-2 are made a pair to construct a Mach-Zehnder type optical waveguide.

Moreover, on the buffer layer 2, are provided a signal electrode to apply a modulating signal to an optical wave through the first branched optical waveguide 3-1, and ground electrodes 5-1 and 5-2. Then, in making the substrate 1 of a Z-cut single crystal like this case, the signal electrode 4 is disposed directly on the first optical waveguide 3-1. The ground electrodes 5-1 and 5-2 serve as opposed electrodes for the signal electrode 4, and are disposed as near as possible the signal electrode 4 so that the total impedance of the electrodes is matched to 50Ω of external impedance and the driving voltage is reduced.

An optical waveguide element 20 depicted in FIG. 2 includes a substrate 11 made of a X-cut single crystal of electro-optical effect and a buffer layer 12 formed on the substrate 11. Moreover, similar to the optical waveguide element 10, the optical waveguide element 20 has a first and a second branched optical waveguides 13-1 and 13-2 to construct a Mach-Zehnder type optical waveguide. Moreover, on the buffer layer 12, are provided signal electrode 14 and ground electrodes 15-1 and 15-2.

In this case, the branched optical waveguide 13-2 is disposed directly under the ground electrode 15-2 so as to apply chirp to an optical wave through the waveguide 13-2. The ground electrodes 15-1 and 15-2 serves as opposed electrodes for the signal electrode as mentioned above.

In the optical waveguide elements 10 and 20 shown in FIGS. 1 and 2, a given half-wavelength voltage is applied to the signal electrodes 4 and 14, to shift the phases of optical waves through the first branched optical waveguides 3-1 and 13-1 for the phases of optical waves through the second branched optical waveguide 3-2 and 13-2 by $\pi$, and thus, to switch on/off an optical signal superimposed on an optical waveguide.

The half-wavelength voltage is calculated on a voltage magnitude when the phase of the optical wave is shifted by $\pi$ from a standard operation point, which is pre-determined on the optical intensity modulation curve of the optical waveguide element.

However, in such a conventional optical waveguide element as shown in FIGS. 1 and 2, the operation point may be shifted due to the change of environmental temperature. Therefore, the half-wavelength voltage is shifted from the pre-determined value, and thus, the optical waveguide element can not be switched on/off well.

Accordingly, in the case of employing the above-mentioned optical waveguide element for an optical modulator of high velocity and large capacity optical fiber communication system, the high reliability and the high stability of the fiber communication system can not be satisfied.

DESCRIPTION OF THE INVENTION

It is an object of the present invention to provide an new high reliable optical waveguide element without operation point shift.

For achieving the above object, this invention relates to an optical waveguide element (first optical waveguide element) including a substrate made of a material with electro-optical effect, a Mach-Zehnder type optical waveguide formed at the main surface of the substrate, and a modulating electrode to control an optical wave through the Mach-Zehnder type optical waveguide. The Mach-Zehnder type optical waveguide includes a first branched optical waveguide and a second branched optical waveguide, and the modulating electrode includes a signal electrode to modulate an optical wave through the first branched optical waveguide of the Mach-Zehnder type optical waveguide and a ground electrode serving as an opposed electrode for the signal electrode. The ground electrode is composed of a first ground electrode and a second ground electrode which are opposed each other with sandwiching the signal electrode. The first branched optical waveguide is disposed under the signal electrode or in between the first ground electrode and the signal electrode, and the second branched optical electrode is disposed under the second ground electrode. The second ground electrode is partially cut away along the long direction and divided, to substantially symmetrize the modulating electrode composed of the signal electrode, the first and the second ground electrodes on the center line between the first and the second branched optical waveguides. Then, the ratio (d2/d1) of the distance d2 between the signal electrode and the second branched optical waveguide to the distance d1 between the signal electrode and the first branched optical waveguide is set within 3.5–7.5.

This invention also relates to an optical waveguide element (second optical waveguide element) including a substrate made of a material with electro-optical effect, a Mach-Zehnder type optical waveguide formed at the main surface of the substrate, and a modulating electrode to control an optical wave through the Mach-Zehnder type optical waveguide. The Mach-Zehnder type optical waveguide includes a first branched optical waveguide and a second branched optical waveguide, and the modulating electrode includes a signal electrode to modulate an optical wave through the first branched optical waveguide of the Mach-Zehnder type optical waveguide and a ground electrode serving as an opposed electrode for the signal electrode. The ground electrode is composed of a first ground electrode and a second ground electrode which are opposed each other with sandwiching the signal electrode. The first branched optical waveguide is disposed under the signal electrode or in between the first ground electrode and the signal electrode, and the second branched optical electrode is disposed under the second ground electrode. The second ground electrode is partially cut away along the long direction and divided, to substantially symmetrize the modulating electrode composed of the signal electrode, the first and the second ground electrodes on the center line between the first and the second branched optical waveguides. Then, the ratio (Ws/Wg) of the width Ws of the signal electrode to the width Wg of the divided part of the second ground electrode located near the signal electrode is set within 0.5–4.

Moreover, this invention relates to an optical waveguide element (third optical waveguide element) including a substrate made of a material with electro-optical effect, a Mach-Zehnder type optical waveguide formed at the main surface of the substrate, and a modulating electrode to control an optical wave through the Mach-Zehnder type optical waveguide. The Mach-Zehnder type optical waveguide includes a first branched optical waveguide and a second branched optical waveguide, and the modulating electrode includes a signal electrode to modulate an optical wave through the first branched optical waveguide of the Mach-Zehnder type optical waveguide and a ground electrode serving as an opposed electrode for the signal electrode. The ground electrode is composed of a first ground electrode and a second ground electrode which are opposed each other with sandwiching the signal electrode. The first branched optical waveguide is disposed under the signal electrode or in between the first ground electrode and the signal electrode, and the second branched optical electrode is disposed under the second ground electrode. The second ground electrode is partially cut away along the long direction and divided into three parts, and the divided first part is disposed on the almost center line between the first and the second branched optical waveguides, and the divided second part and the divided third part are almost the same as the signal electrode and the first ground electrode in figuration and dimension, respectively, to substantially symmetrize the modulating electrode composed of the signal electrode, the first and the second ground electrodes on the center line between the first and the second branched optical waveguides. Then, the width W1 of the divided first part is set 0.5–20 times as large as the width Ws of the signal electrode.

The inventors had intensely studied to find out the cause of operation point shift as mentioned above. Then, they paid attention to "DC drift" and "temperature drift" which are estimated to be two kinds of main factor for the operation point drift, and investigated the operation point shift precisely on the main factors.

As a result, they found out that without a DC bias voltage, the operation point shift is caused, and thus, the DC drift does not contribute to the operation point shift. Then, the inventors had precisely investigated the operation point shift on the temperature drift, and paid attention to the configuration differences of the optical waveguide elements 10 and 20 around the first branched optical waveguides 3-1 and 13-1 and the second branched optical waveguides 3-2 and 13-2.

As a result, the inventors found out that the operation point shift is caused remarkably when the figurations and the dimensions of the signal electrodes 4 and 14 and the ground electrodes 5-1, 5-2, 15-1 and 15-2 are changed. That is, if the figurations and the dimensions of the signal electrodes and the ground electrodes are different, different stresses are exerted on the substrate from the electrodes as the environmental temperature is increased. Accordingly, the refractive index around the optical waveguide is changed due to the different stresses, and the optical waveguide suffers from the refractive index change to cause the operation point shift.

In the optical waveguide element 10 shown in FIG. 1, for example, since the figurations and the dimensions of the signal electrode 4 and the ground electrodes 5-1 and 5-2, which are called as a "modulating electrode", are different one another, different stresses are exerted on the substrate 1 from the electrodes, respectively as the environmental temperature is increased. Therefore, the refractive index change around the signal electrode 4 is different from the ones around the ground electrodes 5-1 and 5-2, and thus, the optical waveguides 3-1 and 3-2 suffer from the respective different refractive index changes from the electrodes. Accordingly, in the optical waveguide element 10, the operation point shift is caused due to the temperature drift.

In this point of view, the inventors have fabricated the portion corresponding to the distance W0 between the ground electrode 5-1 and the signal electrode 4 at the ground electrode 5-2 in FIG. 1, to substantially symmetrize the ground electrode 5-1 and the signal electrode 4 for the ground electrode 5-2 on the center line I—I between the branched optical waveguides 3-1 and 3-2. That is, the ground electrode 5-2 is partially cut away by a W0 width along the long direction of the branched optical waveguides 3-1 and 3-2, to be divided, as shown in FIG. 3. The thus obtained ground electrode 5-3 is symmetrized for the signal electrode 4 and the ground electrode 5-1 on the center line I—I in configuration.

In this case, the figuration and the dimension of the electrodes are symmetrized on both sides from the center line I—I, so the almost same stress is exerted on the substrate from each of the electrodes and thus, the almost same refractive index change is created around the branched optical wave-guides 3-1 and 3-2 as the environmental temperature is increased. As a result, the temperature drift is repressed effectively, and thus, the operation point shift can be prevented.

However, when optical fibers are connected to such an optical waveguide element as having symmetrized signal electrode and ground electrodes on the center line of branched optical waveguides, the transmission property of an optical signal in the optical fibers may be deteriorated, depending on the kind of the optical fiber. Therefore, in some cases, such an optical waveguide element as shown in FIG. 3 can not be practically used, even though operation point shift is not caused in the optical waveguide element.

The inventors had also intensely studied to iron out the deterioration of the transmission property. As a result, they found out that the deterioration of the transmission property results from the chirp characteristic of the optical waveguide element. Conventionally, it was assumed that as the magnitude of the chirp of the optical waveguide element is decreased, the optical fiber dispersion is decreased, to develop the transmission property of the optical fiber. However, the inventors found out that the transmission property of the optical fiber may be developed if the chirp of the optical waveguide element is set to be a larger value, depending on the kind and the length of the optical fiber to be used, and the preferable chirp value is within about 0.4–1.0, particularly within about 0.6–0.8.

Then, the inventors made an attempt to control the chirp of such an optical waveguide element as shown in FIG. 3 in which the operation point shift can be prevented. As a result, if the ratio of the distance between the signal electrode and the first branched optical waveguide to the distance between the signal electrode and the second branched optical waveguide is set to a given value, and thus, the stress exerted on around the first branched optical waveguide and the stress exerted on around the second branched optical waveguide are balanced and substantially symmetrized in both sides from the center between the branched optical waveguides, the chirp characteristic of the optical waveguide element can be controlled with preventing the operation point shift. The first optical waveguide element of the present invention is realized on the above-mentioned fact of the matter.

FIG. 4 is a cross sectional view showing one example of the first optical waveguide element of the present invention. Herein, for clarifying the characteristics of the optical waveguide element, the dimensions and figurations of some parts are different from the real ones.

An optical waveguide element 30 includes a substrate 21 made of a X-cut ferroelectric single crystal with electro-optical effect, a buffer layer 22 and a first and a second branched optical waveguides 23-1 and 23-2 to constitute a Mach-Zehnder type optical waveguide at the surface of the substrate 21. Then, on the buffer layer 22, are provided a signal electrode 24, a first ground electrode 25-1 and a second ground electrode 25-2. The second ground electrode 25-2 is partially cut away along the long direction and divided, to form a ditch 26 therein. As a result, the first ground electrode 25-1, the signal electrode 24 and the second ground electrode 25-2 are arranged symmetrically on the center line II—II between the branched optical waveguides. Therefore, the operation point shift of the optical waveguide element 30 can be prevented.

Then, the ratio (d2/d1) of the distance d2 between the signal electrode 24 and the second branched optical electrode 23-2 for the distance d1 between the signal electrode 24 and the first branched optical waveguide 23-1 is set within 3.5–7.5, according to the present invention. In this case, the overlap degree of a signal electric field to be applied are made asymmetric for the first and the second branched optical waveguides 23-1 and 23-2, with balancing the stresses from the electrodes on the center line II—II. Therefore, chirp can be created in the optical waveguide element 30 to some degree with preventing the temperature drift thereof. Concretely, chirp of about 0.6–0.8 can be created in the element 30. Therefore, in the optical waveguide element 30 according to the first optical waveguide element of the present invention, the operation point shift can be prevented, and the transmission property can be improved through the chirp creation of about 0.6–0.8.

The inventors also found out that in such an optical waveguide element as shown in FIG. 3, if the width of the signal electrode is shifted to the width of the second ground electrode, and thus, the ratio of the width of the signal electrode to the width of the second ground electrode is set to a given value, with symmetrizing the signal electrode and the ground electrodes, the chirp characteristic of the optical waveguide element can be controlled. The second optical waveguide element of the present invention is realized on the fact of the matter.

FIG. 5 is a cross sectional view showing one example of the second optical waveguide element of the present invention.

An optical waveguide element 40 as shown in FIG. 5 includes a substrate 31 made of a X-cut ferroelectric single crystal with electro-optical effect, a buffer layer 32, and a first and a second branched optical waveguides 33-1 and 33-2 to constitute a Mach-Zehnder type optical waveguide at the surface of the substrate 31. Then, on the buffer layer 32, are provided a signal electrode 34, a first and a second ground electrodes 35-1 and 35-2. The second ground electrode 35-2 is partially cut away along the long direction, and divided. As a result, the first ground electrode 35-1, the signal electrode 34 and the second ground electrode 35-2 are arranged substantially symmetrically on the center line III—III between the first and the second branched optical waveguides 33-1 and 33-2. Therefore, the operation point shift can be prevented.

Also, the ratio (Ws/Wg) of the width Ws of the signal electrode 34 to the width Wg of the second ground electrode 35-2 is set within 0.5–4. Therefore, the overlap degree of a signal electric field to be applied are made asymmetric for the first and the second branched optical waveguides 33-1 and 33-2, with balancing the stresses from the electrodes on the center line III—III. Therefore, chirp can be created in the optical waveguide element 40 to some degree with preventing the temperature drift thereof. Concretely, chirp of about 0.4–0.9 can be created in the element 40. Therefore, in the optical waveguide element 40 according to the second optical waveguide element of the present invention, the operation point shift can be prevented, and the transmission property can be improved through the chirp creation of about 0.4–0.9.

The inventors also contrived the configuration of the second ground electrode divided in symmetrizing the signal electrode and the ground electrodes on the center line between the branched optical waveguides. In the above examples, that is, the second ground electrode is divided into two parts, to symmetrize the electrodes on the center line. On the contrary, the second ground electrode is divided into three parts, and the divided first part located near the signal electrode is disposed on the center line between the branched optical waveguides. In this case, since the signal electrode and the ground electrodes are arranged substantially symmetically on the center line between the branched optical waveguides, the operation point shift can be effectively prevented. Then, if the width of the first part is set to a given value as compared with the width of the signal electrode, the chirp characteristic can be controlled. The third optical waveguide electrode is realized on the fact of the matter.

FIG. 6 is a cross sectional view showing one example of the third optical waveguide element of the present invention. An optical waveguide element 50 shown in FIG. 6 includes a substrate 41 made of a X-cut ferro-electric single crystal with electro-optical effect, a buffer layer 42, and a first and a second branched optical waveguides 43-1 and 43-2 to constitute a Mach-Zehnder type optical waveguide at the surface of the substrate 41. Then, on the buffer layer 42, are provided a signal electrode 44, a first and a second ground electrodes 45-1 and 45-2. The second ground electrode 45-2 is partially cut away along the long direction and divided in three parts, to form ditches 46-1 and 46-2. As a result, the second ground electrode 45-2 is constructed of a first part 48-1, a second part 48-1 and a third part 48-3.

Moreover, since the width W1 of the first part 48-1 of the second ground electrode 45-1 is set 0.5–20 time as large as the width Ws of the signal electrode 44, an asymmetric signal can be applied to the first and the second branched optical waveguides with balancing the stresses from the electrodes for the optical waveguides. As a result, chirp can be created in the optical waveguide element with preventing the operation point shift. Concretely, chirp of about 0.4–1.0 can be created in the optical waveguide element. Accordingly, in the optical waveguide element 50 according to the third optical waveguide element of the present invention, the operation point shift can be prevented, and the transmission property can be improved through the chirp creation of about 0.4–1.0.

Herein, the phrase "the second branched optical waveguide is disposed under the second ground electrode" includes the state in which the second branched optical waveguide is disposed under the not-divided second ground electrode, concretely the state in which the second branched optical waveguide is disposed under a thin film formed at the ditch of the divided second ground electrode as shown in FIG. 5.

BRIEF DESCRIPTION OF DRAWINGS

The invention will be more particular described with reference to the accompanying drawings, in which.

BEST MODE FOR CARRYING OUT THE INVENTION

Figure 4:
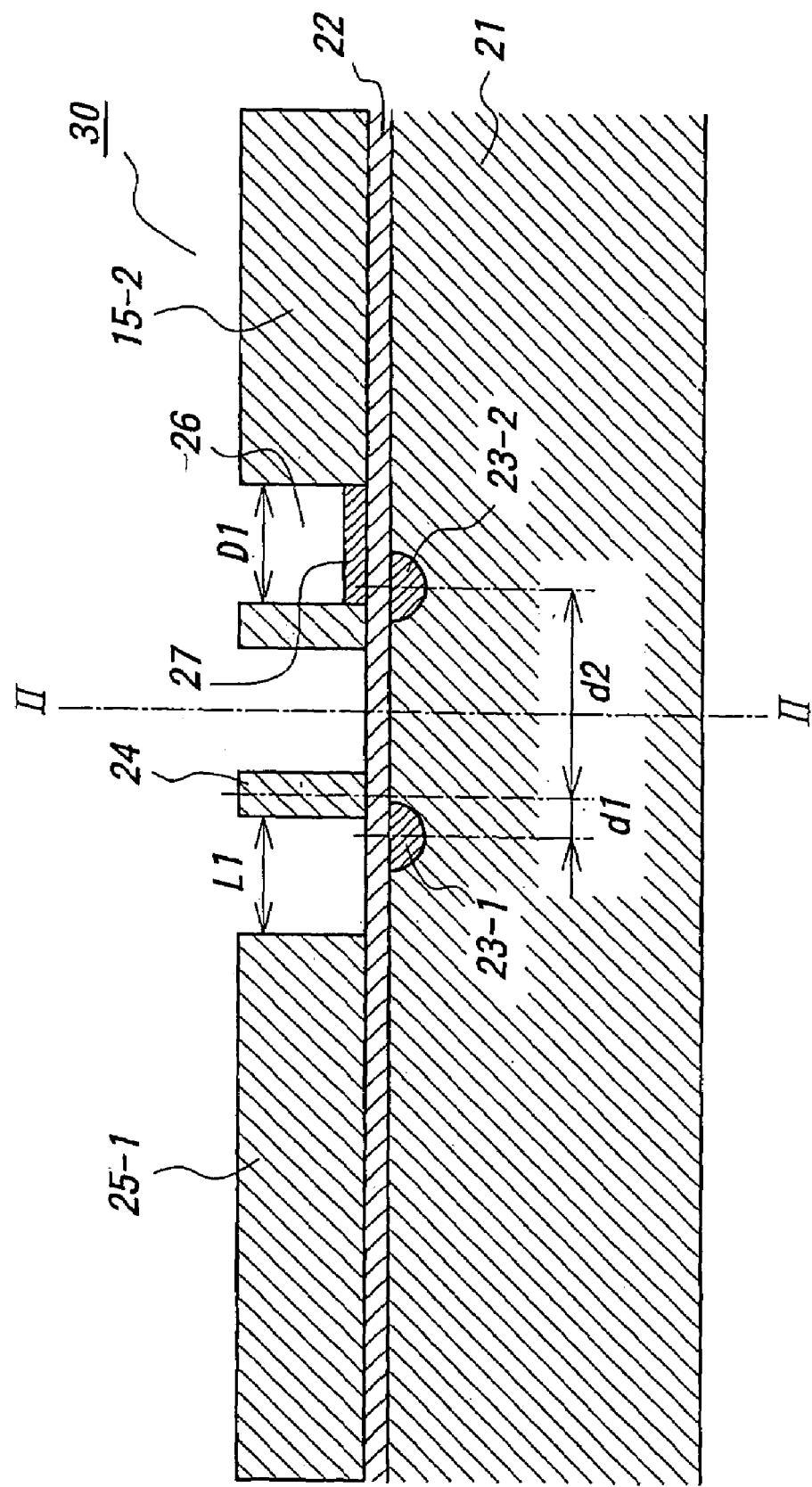
FIG. 4 is a cross sectional view showing one example of the first optical waveguide element of the present invention.
Figure 5:
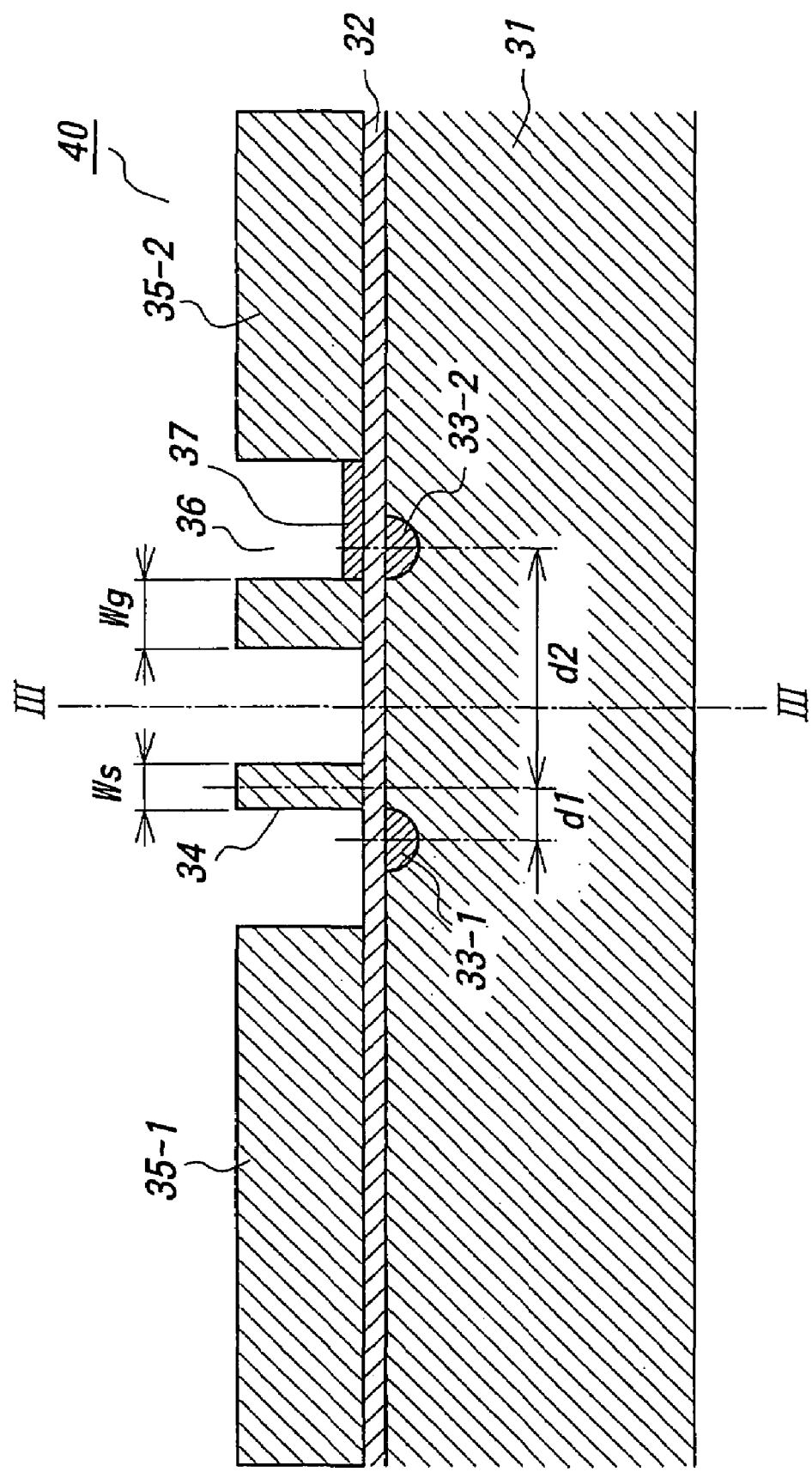
FIG. 5 is a cross sectional view showing one example of the second optical waveguide element of the present invention.
Figure 6:
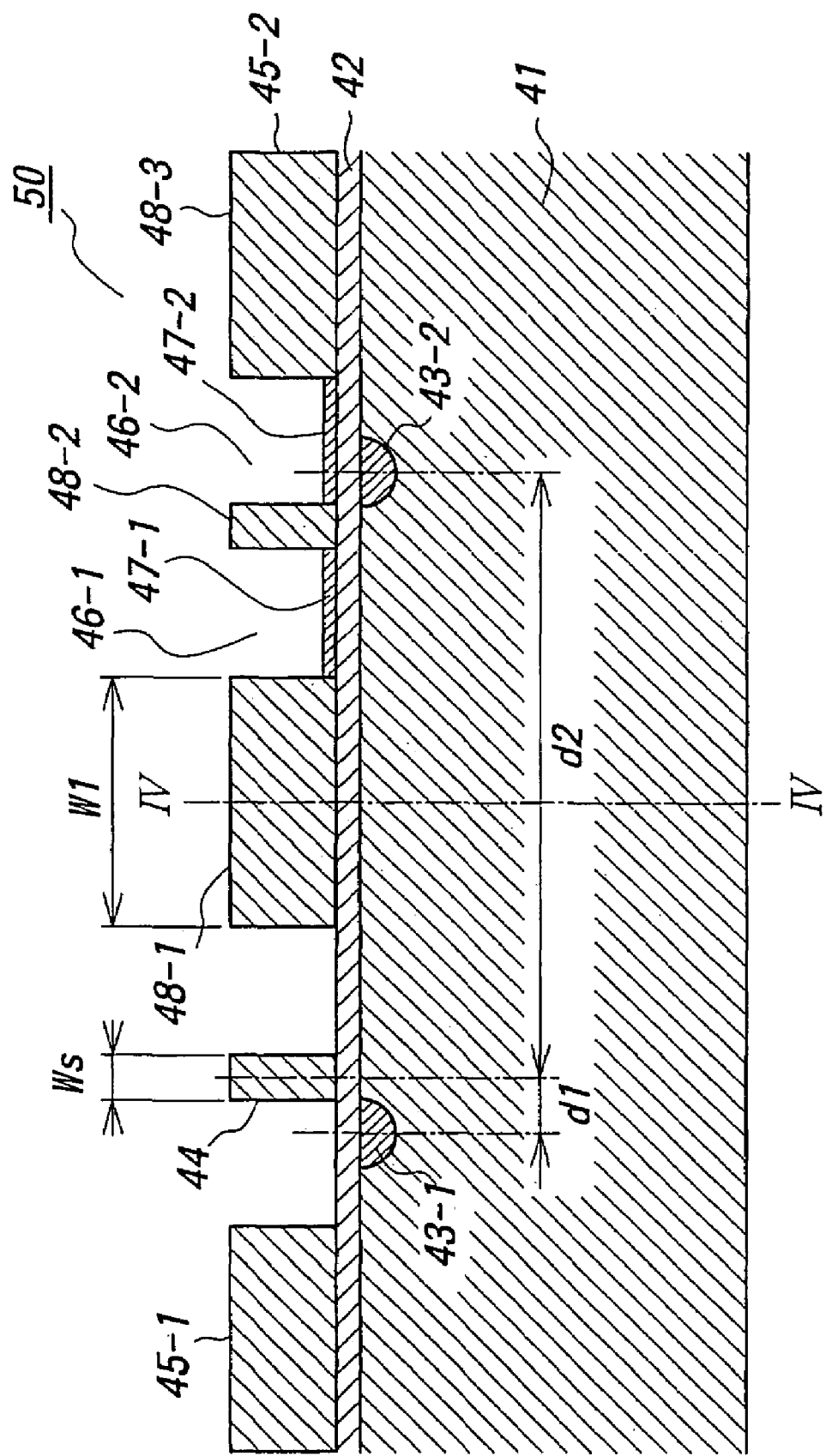
FIG. 6 is a cross sectional view showing one example of the third optical waveguide element of the present invention.

The invention will be described in detail with reference to the above drawings as follows:

In the optical waveguide element 30, 40 or 50 shown in FIGS. 4–6, the second ground electrode is partially cut away and divided along the long direction, to form the ditch 26 etc. The division of the second ground electrode through the ditch formation may be performed at the same time when the signal electrode and the ground electrodes are formed by a sputtering method or the like, or by exposure and development treatment using a given mask for a planer electrode formed over the substrate (over the buffer layer in FIGS. 4–6).

In the second optical waveguide element of the present invention, since the ratio of the width of the signal electrode to the width of the divided part of the second ground electrode located near the signal electrode is set within the above-mentioned range, chirp of a given magnitude can be created in the optical waveguide element.

However, it is desired that the distance between the first branched optical waveguide and the signal electrode is set different from the distance between the second branched optical waveguide and the signal electrode. That is, in the optical waveguide element 40 shown in FIG. 5, the ratio (d2/d1) of the distance d2 between the signal electrode 34 and the second branched optical electrode 33-2 to the distance d1 between the signal electrode 34 and the first branched optical electrode 33-1 is set within 3.5–7.5, particularly 5.4–6.0.

In this case, relatively large chirp of 0.4–1.0, particularly 0.6–0.8 can be easily created in the optical waveguide element 40. Therefore, combining the ratio variation, chirp of wide range can be easily created in the optical waveguide element 40, and as a result, the selectivity of the kind and the dimension of an optical fiber to be used can be increased.

Similarly, in the third optical waveguide element of the present invention, it is desired that the distance between the first branched optical waveguide and the signal electrode is set different from the distance between the second branched optical waveguide and the signal electrode, as mentioned above. That is, in the optical waveguide element 50 shown in FIG. 6, the ratio (d2/d1) of the distance d2 between the signal electrode 44 and the second branched optical electrode 43-2 to the distance d1 between the signal electrode 44 and the first branched optical electrode 43-1 is set within 10–27.

Also, in the optical waveguide elements shown in FIGS. 4–6, thin films are formed of conductive materials at the ditches formed at the divided second ground electrodes, respectively. Concretely, a thin film 27 is formed at the ditch 26 of the optical waveguide element 30 shown in FIG. 4, and a thin film 37 is formed at the ditch 36 of the optical waveguide element 40 shown in FIG. 5, and thin films 47-1 and 47-2 are formed at the ditches 46-1 and 46-2 of the optical waveguide element 50 shown in FIG. 6, respectively.

In this case, the degradation in conductivity of the divided second ground electrode can be compensated, and thus, the high frequency performance can be improved effectively. However, without the thin film, the object of the present invention can be realized sufficiently.

In addition, since the thin films 27 or the like are formed thinner, and thus, the stiffness of the thin films are very small, with the thin film, the object of the present invention can be realized.

These thin films may be made of a conductive material such as Al, Cu, Ni—Cr, Au and Ti, respectively.

The substrates 21 or the like are required to be made of an electro-optical material, concretely may be made of a ferroelectric single crystal such as lithium niobate ($LiNbO_3$), lithium tantalate ($LiTaO_3$) and lead lanthanum zirconate titanate (PLZT). In the optical waveguide elements 30 or the like, X-cut ferroelectric single crystals are employed as the substrates 21 or the like, but Y-cut or Z-cut ferroelectric single crystals may be employed.

The optical waveguide including the branched optical waveguide may be made by a publicly known method such as a Ti diffusion method or a proton-exchanging method.

Moreover, the signal electrode and the ground electrode may be made of a conductive material such as Au, Ag, Cu, respectively by using a combination method of a publicly known film-forming method such as a vacuum deposition method or a sputtering method and a plating method.

EXAMPLES

This invention will be concretely described on the examples, with reference to the drawings.

Example 1

In this example, such an optical waveguide element 30 as shown in FIG. 4 was fabricated.

The substrate 21 was made of a X-cut lithium niobate single crystal. Then, a Mach-Zehnder type optical waveguide pattern was fabricated from photoresist on the substrate 21. Then, Ti material was deposited via the pattern on the substrate 21 by a deposition method. Thereafter, the substrate 21 including the deposited Ti material was heated at 950–1050° C. for 10–20 hours, to diffuse the Ti material into the substrate 21 and to fabricate the first and the second branched optical waveguides 23-1 and 23-2 to constitute a Mach-Zehnder type optical waveguide.

Then, the buffer layer 22 was made of silicon oxide in a thickness of 0.5 µm on the substrate 21. Thereafter, the signal electrode 24, the first ground electrode 25-1 and the divided second ground electrode 25-2 were formed of Au material in a thickness of 15 µm by a combination method of deposition and plating using a mask with the openings corresponding to the signal electrode and the ground electrodes. Then, the thin film 27 was made of Al material in a thickness of 2000 Å at the ditch 26 of the second ground electrode 25-2.

The width D1 of the ditch 26 was set to 25 µm equal to the gap L1 between the signal electrode 24 and the first ground electrode 25-1. Moreover, the distance d1 between the signal electrode 24 and the first branched optical electrode 23-1 was set to 7 µm, and the distance d2 between the signal electrode 24 and the second branched optical electrode 23-2 was set to 41 µm.

Thereafter, optical fibers were connected to the input and the output of the Mach-Zehnder type optical waveguide including the branched optical waveguides of the thus obtained optical waveguide element 30, and the operation point shift was investigated under the temperature range of 0–70° C. As a result, it was turned out that the operation point shift was 0.6V. Moreover, when the chirp of the optical waveguide element 30 was investigated with an optical component analyzer, it was turned out that the chirp was 0.78.

Example 2

In this example, such an optical waveguide element 40 as shown in FIG. 5 was fabricated. Fundamentally, the optical waveguide element 40 was fabricated by the same manner as Example 1. The distance d1 between the signal electrode 34 and the first branched optical waveguide 33-1 was set to 7 µm, and the distance d2 between the signal electrode 34 and the second branched optical waveguide 33-2 was set to 44 µm. The width Ws of the signal electrode 34 was set to 7 µm, and the width Wg of the divided part of the second ground electrode 35-2 located near the signal electrode 34 was set to 10 µm.

Thereafter, optical fibers were connected to the input and the output of the Mach-Zehnder type optical waveguide including the branched optical waveguides of the thus obtained optical waveguide element 40, and the operation point shift was investigated under the temperature range of 0–70° C. As a result, it was turned out that the operation point shift was 0.8V. Moreover, when the chirp of the optical waveguide element 40 was investigated with an optical component analyzer, it was turned out that the chirp was 0.83.

Example 3

In this example, such an optical waveguide element 50 as shown in FIG. 6 was fabricated. Fundamentally, the optical waveguide element 50 was fabricated by the same manner as Example 1. The distance d1 between the signal electrode 44 and the first branched optical waveguide 43-1 was set to 7 µm, and the distance d2 between the signal electrode 44 and the second branched optical waveguide 43-2 was set to 114 µm. The width Ws of the signal electrode 44 was set to 7 µm, and the width W1 of the divided first part of the second ground electrode 45-2 was set to 50 µm.

Thereafter, optical fibers were connected to the input and the output of the Mach-Zehnder type optical waveguide including the branched optical waveguides of the thus obtained optical waveguide element 50, and the operation point shift was investigated under the temperature range of 0–70° C. As a result, it was turned out that the operation point shift was 0.3V. Moreover, when the chirp of the optical waveguide element 50 was investigated with an optical component analyzer, it was turned out that the chirp was 0.95.

Comparative Example

Figure 1:
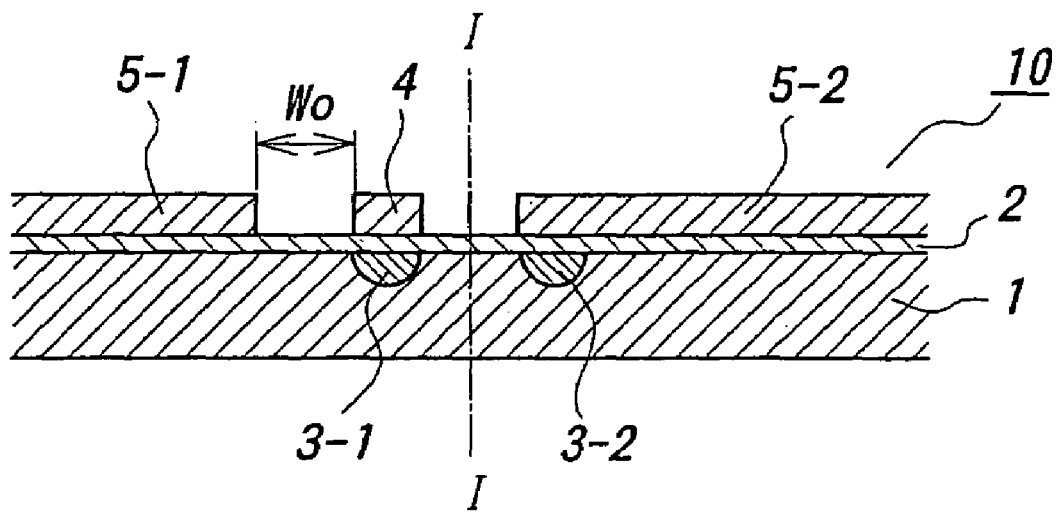
FIG. 1 is a cross sectional view showing a conventional optical waveguide element.
Figure 2:
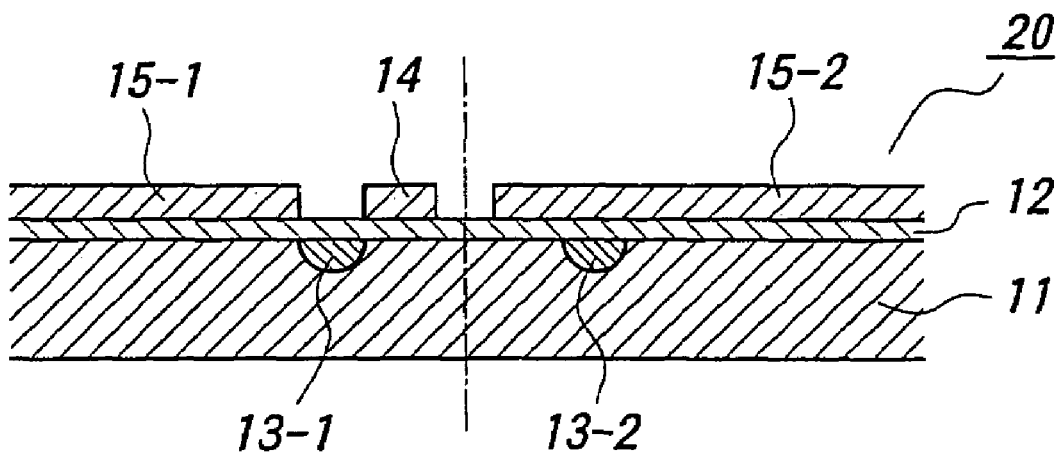
FIG. 2 is a cross sectional view showing another optical waveguide element.
Figure 3:
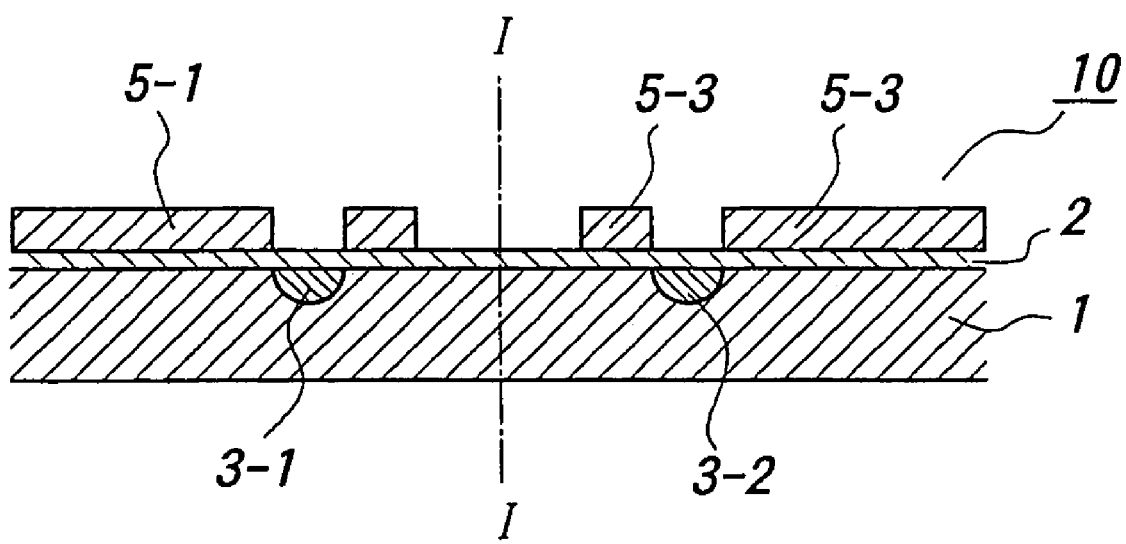
FIG. 3 is a standard model of an optical waveguide element on the basis of which an optical waveguide element according to the present invention can be realized.

In this comparative example, such an optical waveguide element 20 as shown in FIG. 2. Except that the second ground electrode was not divided and the thin film was not formed, the optical waveguide element 20 was fabricated by the same manner as Example 1. The distances between the signal electrode 14 and the first ground electrode 15-1 and between the signal electrode 14 and the second ground electrode 15-2 were set to 25 µm, respectively.

When the operation point shift and the chirp of the thus obtained optical waveguide element 20 were investigated by the same manner as Examples, it was turned out that the operation point shift was 11.0V, and the chirp was 0.7.

Apparent from the above Examples and Comparative Example, in the optical waveguide element according to the present invention, the operation point shift is reduced, and thus, high stability and reliability can be realized. Also, chirp can be created in the optical waveguide element to some degree, and as a result, the chirp characteristic of the optical waveguide element can be appropriately controlled with reducing the operation point shift. Accordingly, the optical waveguide element can be preferably combined with optical fibers requiring larger chirp, and thus, the transmission property can be improved when such optical fibers are employed.

In addition to varying the distance between the signal electrode and the first branched optical waveguide for the distance between the signal electrode and the second branched optical waveguide, if the width of the divided part of the second ground electrode located near the signal electrode is varied for the width of the signal electrode, the chirp of the optical waveguide element can be much increased.

Although the present invention was described in detail with reference to the above examples, this invention is not limited to the above disclosure and every kind of variation and modification may be made without departing from the scope of the present invention.

Figure 7:
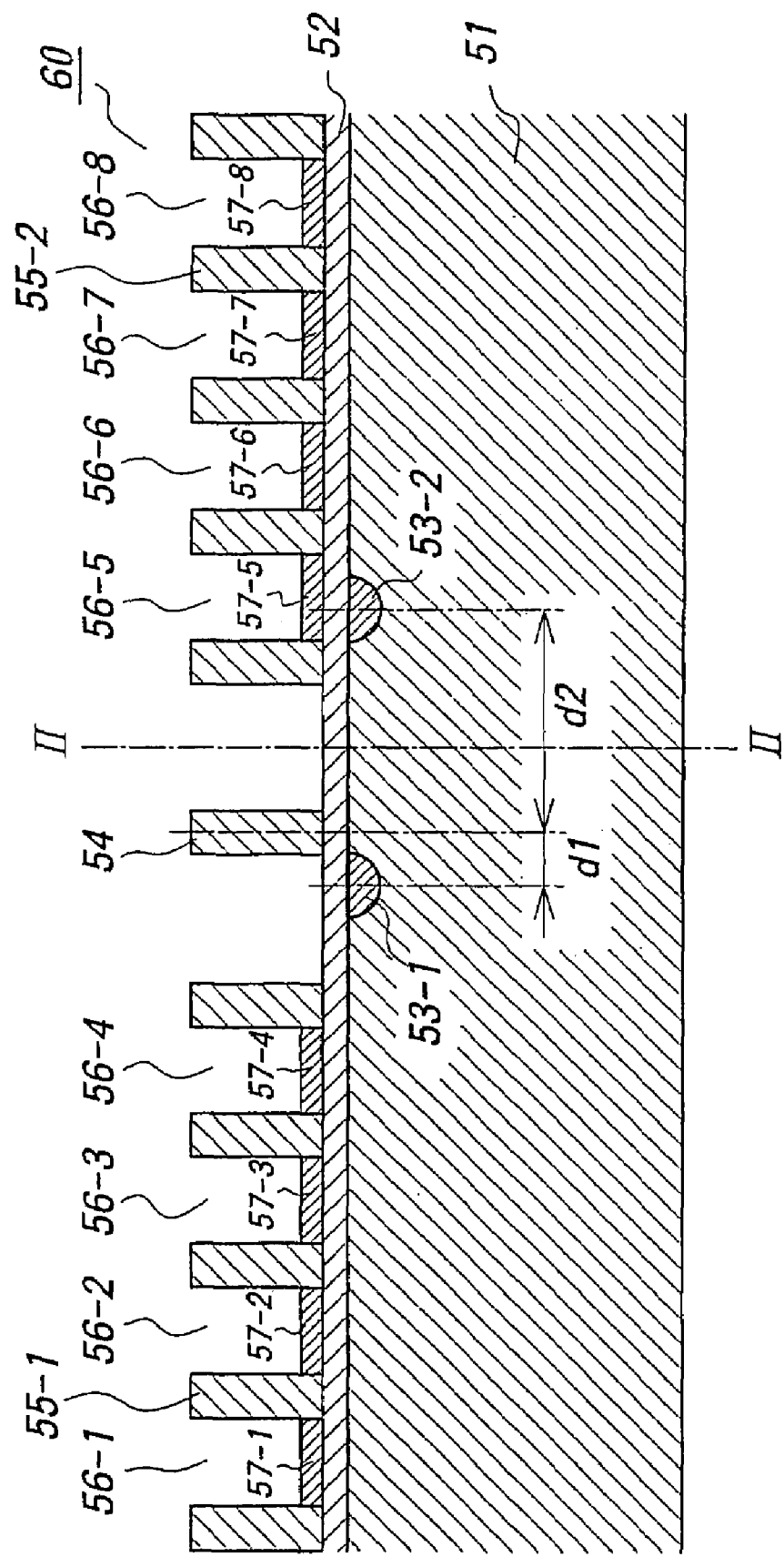
FIG. 7 is a cross sectional view showing a modified example of the first optical waveguide element of the present invention.

For example, in the optical waveguide element 30 shown in FIG. 4, the first ground electrode and the second ground electrode are divided into plural parts, to fabricate an optical waveguide element 60 as shown in FIG. 7. In this case, as mentioned above, it is desired that thin films 57-1 through 57-8 are formed at the ditches 56-1 through 56-8, respectively.

(Industrial Applicability)

In an optical waveguide element according to the present invention, operation point shift due to temperature drift is not caused as the environmental temperature is changed. Therefore, the optical waveguide element can be preferably used for an optical modulator in high velocity and large capacity optical fiber communication system requiring long-term reliability and stability.

Also, since chirp can be created in the optical waveguide element to some degree, the selectivity of optical fiber can be expanded in its size and figuration for the optical waveguide element. As a result, an optical modulator able to meet many application can be provided.

The invention claimed is:

1. An optical waveguide element comprising a substrate made of a material with electro-optical effect, a Mach-Zehnder type optical waveguide formed at the main surface of the substrate, and a modulating electrode to control an optical wave through the Mach-Zehnder type optical waveguide, the Mach-Zehnder type optical waveguide including a first branched optical waveguide and a second branched optical waveguide, the modulating electrode including a signal electrode to modulate an optical wave through the first branched optical waveguide of the Mach-Zehnder type optical waveguide and a ground electrode serving as an opposed electrode for the signal electrode, the ground electrode being composed of a first ground electrode and a second ground electrode which are opposed each other with sandwiching the signal electrode, the first branched optical waveguide being disposed under the signal electrode or in between the first ground electrode and the signal electrode, the second branched optical electrode being disposed under the second ground electrode, the second ground electrode being partially cut away along the long direction and divided into three parts, the divided first part being disposed on the almost center line between the first and the second branched optical waveguides, the divided second part and the divided third part being almost the same as the signal electrode and the first ground electrode in figuration and dimension, respectively, to substantially symmetrize the modulating electrode composed of the signal electrode, the first and the second ground electrodes on the center line between the first and the second branched optical waveguides, the width W1 of the divided first part being set 0.5–20 times as large as the width Ws of the signal electrode.

2. An optical waveguide element as defined in claim 1, wherein the ratio (d2/d1) of the distance d2 between the signal electrode and the second branched optical waveguide to the distance d1 between the signal electrode and the first branched optical waveguide being set within 10–27.

3. An optical waveguide element as defined in claim 2, wherein a chirp characteristic is controlled.

4. An optical waveguide element as defined in claim 1, wherein a chirp characteristic is controlled.

5. An optical waveguide element comprising:

a substrate made of a material with electro-optical effect;

a Mach-Zehnder type optical waveguide formed at the main surface of the substrate; and a modulating electrode to control an optical wave through the Mach-Zehnder type optical waveguide, the Mach-Zehnder type optical waveguide including a first branched optical waveguide and a second branched optical waveguide, the modulating electrode including a signal electrode to modulate an optical wave through the first branched optical waveguide of the Mach-Zehnder type optical waveguide and a ground electrode serving as an opposed electrode for the signal electrode, the ground electrode being composed of a first ground electrode and an opposing second ground electrode sandwiching the signal electrode, the first branched optical waveguide being disposed under the signal electrode or in between the first ground electrode and the signal electrode, the second branched optical electrode being disposed under the second ground electrode, the second ground electrode being partially cut away along the long direction and divided, to substantially symmetrize the modulating electrode composed of the signal electrode, the first and the second ground electrodes on a center line between the first and the second branched optical waveguides, wherein, a thin film is formed of a conductive material at a bottom of a ditch formed at the divided second ground electrode, the thin film not filling the ditch, and the ratio (d2/d1) of the distance d2 between the signal electrode and the second branched optical waveguide to the distance d1 between the signal electrode and the first branched optical waveguide being set within 3.5 and 7.5, wherein, the second ground electrode is divided into three parts, the divided first part being along the center line between the first and the second branched optical waveguides, and the divided second part and the divided third part being arranged in symmetry to the signal electrode and the first ground electrode.

6. An optical waveguide element as defined in claim 5, wherein a chirp characteristic is controlled.

7. An optical waveguide element as defined in claim 5, wherein the divided second part and the divided third part are approximately the same as the signal electrode and the first ground electrode in configuration and dimension, to substantially make symmetric the modulating electrode composed of the signal electrode, the first and the second ground electrodes on the center line between the first and the second branched waveguides.

8. An optical waveguide element comprising:

a substrate made of a material with electro-optical effect:

a Mach-Zehnder type optical waveguide formed at the main surface of the substrate; and a modulating electrode to control an optical wave through the Mach-Zehnder type optical waveguide, the Mach-Zehnder type optical waveguide including a first branched optical waveguide and a second branched optical waveguide, the modulating electrode including a signal electrode to modulate an optical wave through the first branched optical waveguide of the Mach-Zehnder type optical waveguide and a ground electrode serving as an opposed electrode for the signal electrode, the ground electrode being composed of a first ground electrode and a second ground electrode which first and second ground electrodes are opposed to each other sandwiching the signal electrode, the first branched optical waveguide being disposed under the signal electrode or in between the first ground electrode and the signal electrode, the second branched optical electrode being disposed under the second ground electrode, the second ground electrode being partially cut away along the long direction and divided, to substantially symmetrize the modulating electrode composed of the signal electrode, the first and the second ground electrodes on the center line between the first and the second branched optical waveguides, wherein, a thin film is formed of a conductive material at a bottom of a ditch formed at the divided second ground electrode, the thin film not filling the ditch, and a ratio (Ws/Wg) of the width Ws of the signal electrode to the width Wg of the divided part of the second ground electrode located near the signal electrode being set within 0.5 and 4, wherein, the second ground electrode is divided into three parts, the divided first part being along the center line between the first and the second branched optical waveguides, and the divided second part and the divided third part being arranged in symmetry to the signal electrode and the first ground electrode.

9. An optical waveguide element as defined in claim 5, wherein a ratio (d2/d1) of the distance d2 between the signal electrode and the second branched optical waveguide to the distance d1 between the signal electrode and the first branched optical waveguide being set within 3.5 and 7.5.

10. An optical waveguide element as defined in claim 8, wherein the divided second part and the divided third part are approximately the same as the signal electrode and the first ground electrode in configuration and dimension, to substantially make symmetric the modulating electrode composed of the signal electrode, the first and the second ground electrodes on the center line between the first and the second branched waveguides.

11. An optical waveguide element comprising:

a substrate made of a material with electro-optical effect;

a Mach-Zehnder type optical waveguide formed at the main surface of the substrate; and a modulating electrode to control an optical wave through the Mach-Zehnder type optical waveguide, the Mach-Zehnder type optical waveguide including a first branched optical waveguide and a second branched optical waveguide, the modulating electrode including a signal electrode to modulate an optical wave through the first branched optical waveguide of the Mach-Zehnder type optical waveguide and a ground electrode serving as an opposed electrode for the signal electrode, the ground electrode being composed of a first ground electrode and a second ground electrode which are opposed to each other sandwiching the signal electrode, the first branched optical waveguide being disposed under the signal electrode or in between the first ground electrode and the signal electrode, the second branched optical electrode being disposed under the second ground electrode, the second ground electrode being partially cut away along the long direction and divided, to balance and substantially symmetrize the stresses for the first and the second branched optical waveguides from the modulating electrode composed of the signal electrode, the first and the second ground electrodes on the center line between the first and the second branched optical waveguides, wherein, a thin film is formed of a conductive material at a bottom of a ditch formed at the divided second ground electrode, the thin film not filling the ditch, wherein, the second ground electrode is divided into three parts, the divided first part being along the center line between the first and the second branched optical waveguides, and the divided second part and the divided third part being arranged in symmetry to the signal electrode and the first ground electrode.

12. An optical waveguide element as defined in claim 11, wherein a chirp characteristic is controlled.

13. An optical waveguide element as defined in claim 11, wherein the divided second part and the divided third part are approximately the same as the signal electrode and the first ground electrode in configuration and dimension, to substantially make symmetric the modulating electrode composed of the signal electrode, the first and the second ground electrodes on the center line between the first and the second branched waveguides.

* * * * *